(12) United States Patent
Kinion et al.

(10) Patent No.: US 12,500,475 B2
(45) Date of Patent: Dec. 16, 2025

(54) ELECTRIC DRIVE UNIT HAVING A FLUID FLOW PATH

(71) Applicant: Schaeffler Technologies AG & Co. KG, Herzogenaurach (DE)

(72) Inventors: David Kinion, Cuyahoga Falls, OH (US); Kyle Nelson, Wadsworth, OH (US); Christopher Chapanar, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 428 days.

(21) Appl. No.: 18/163,669

(22) Filed: Feb. 2, 2023

(65) Prior Publication Data

US 2024/0266903 A1    Aug. 8, 2024

(51) Int. Cl.
  *H02K 5/20*     (2006.01)
  *H02K 5/15*     (2006.01)
  *H02K 5/173*    (2006.01)
  *H02K 7/08*     (2006.01)
  *H02K 7/116*    (2006.01)
  *H02K 9/197*    (2006.01)
  *H02K 11/40*    (2016.01)

(52) U.S. Cl.
  CPC .............. *H02K 5/203* (2021.01); *H02K 5/15* (2013.01); *H02K 5/1732* (2013.01); *H02K 7/083* (2013.01); *H02K 7/116* (2013.01); *H02K 9/197* (2013.01); *H02K 11/40* (2016.01)

(58) Field of Classification Search
  CPC .......... H02K 5/203; H02K 11/40; H02K 5/15; H02K 5/1732; H02K 7/083; H02K 7/116; H02K 9/197
  See application file for complete search history.

(56) References Cited

U.S. PATENT DOCUMENTS

2016/0164378 A1   6/2016   Gauthier et al.
2022/0107016 A1   4/2022   Griesbach et al.

FOREIGN PATENT DOCUMENTS

CN   101820194 A   9/2010
CN   113078776 A   7/2021
EP   0797287 B1    7/2001

*Primary Examiner* — Terrance L Kenerly
(74) *Attorney, Agent, or Firm* — Price Heneveld LLP

(57) ABSTRACT

An electric drive unit includes a housing, a motor, a sleeve, first and second seals, and a bearing. The housing defines gearbox and motor housing regions, and first and second channels extending between the gearbox and motor housing regions. The motor is disposed within the motor housing region and has a rotor and a rotor shaft that is rotationally driven about an axis. The sleeve extends circumferentially along an exterior surface of the rotor shaft and has an inner surface that interfaces with the exterior surface, and an outer surface opposite the inner surface. The first seal extends between the outer surface of the sleeve and the housing. The second seal extends between the inner surface of the sleeve and the exterior surface of the rotor shaft. The bearing is positioned radially between the rotor shaft and the housing and axially between the first seal and the gearbox region.

15 Claims, 5 Drawing Sheets

ELECTRIC DRIVE UNIT HAVING A FLUID FLOW PATH

FIELD OF THE DISCLOSURE

The present disclosure generally relates to an electric drive unit for a vehicle. More specifically, the present disclosure relates to a fluid flow path of an electric drive unit for a vehicle.

BACKGROUND OF THE DISCLOSURE

Electric drive units generally define flow paths for fluids, such as oil, that lubricate and cool various components within electric drive units. An effective flow path with a small radial footprint may be desirable.

SUMMARY OF THE DISCLOSURE

According to a first aspect of the present disclosure, an electric drive unit includes a housing, a motor, a sleeve, a first seal, a second seal, and a bearing. The housing defines a gearbox region, a motor housing region, a first channel extending between the gearbox region and the motor housing region, and a second channel extending between the gearbox region and the motor housing region. The motor is disposed within the motor housing region and has a rotor and a rotor shaft that is configured to be rotationally driven about an axis. The rotor shaft has an interior surface that defines a hollow, an exterior surface opposite the interior surface, and a port that extends between the interior and exterior surfaces. The hollow and the port form a portion of a fluid flow path. The sleeve extends circumferentially along the exterior surface of the rotor shaft proximate to the port and has an inner surface that interfaces with the exterior surface and an outer surface opposite the inner surface. The first seal extends between the outer surface of the sleeve and the housing. The second seal extends between the inner surface of the sleeve and the exterior surface of the rotor shaft. The bearing is positioned radially between the rotor shaft and the housing and axially between the first seal and the gearbox region. The fluid flow path is configured to sequentially convey fluid within the hollow, through the port, into a receiving area of the fluid flow path that is positioned axially between the first seal and the bearing and radially between the exterior surface of the rotor shaft and the housing, through the first channel, into the gearbox region, and through the second channel back into the receiving area of the fluid flow path.

Embodiments of the first aspect of the disclosure can include any one or a combination of the following features:
 a shunt fixed to the first seal and extending between the sleeve and the housing to ground the rotor shaft to the housing via the sleeve;
 the first and second seals are configured to prevent the fluid from flowing to the rotor;
 the sleeve includes a first portion that extends axially away from the gearbox region from a first end of the sleeve to a connecting portion that extends radially outboard from the first portion, and a second portion that extends axially away from the gearbox region from the connecting portion to a second end of the sleeve, wherein the first seal extends between the outer surface of the first portion of the sleeve and the housing, and the second seal extends between the inner surface of the second portion of the sleeve and the exterior surface of the rotor shaft;
 the exterior surface of the rotor shaft defines an annular recess, and the second seal comprises an o-ring received within the annular recess;
 the housing includes an outer wall that extends circumferentially about the motor, and a bearing shield that extends radially inboard from the outer wall, wherein the bearing is positioned radially between the bearing shield and the rotor shaft;
 the first seal extends between the outer surface of the sleeve and a portion of the bearing shield;
 the bearing shield extends between and partially defines the gearbox region and the motor housing region, the first channel defined by the housing extends through the bearing shield from the receiving area to the gearbox region, and the second channel defined by the housing extends through the bearing shield from the receiving area to the gearbox region;
 the first and second channels extend through the bearing shield radially outboard of the bearing; and
 the housing further includes a top, and a bottom opposite the top, wherein the first channel is positioned elevationally between the rotor shaft and the bottom, and the second channel is positioned elevationally between the rotor shaft and the top.

According to a second aspect of the present disclosure, an electric drive unit includes a housing, a motor, a sleeve, and a first seal. The motor is disposed within the housing and has a rotor and a rotor shaft that is configured to be rotationally driven about an axis. The rotor shaft has an interior surface that defines a hollow, an exterior surface opposite the interior surface, and a port that extends between the interior and exterior surfaces. The sleeve extends circumferentially along the exterior surface of the rotor shaft proximate to the port and has an inner surface that interfaces with the exterior surface and an outer surface opposite the inner surface. The first seal extends between the outer surface of the sleeve and the housing.

Embodiments of the second aspect of the disclosure can include any one or a combination of the following features:
 a second seal extending between the inner surface of the sleeve and the exterior surface of the rotor shaft;
 the first seal is a lip seal and the second seal is an o-ring;
 a shunt fixed to the first seal and extending between the sleeve and the housing to ground the rotor shaft to the housing via the sleeve; and
 the sleeve includes a first portion that extends axially from a first end of the sleeve to a connecting portion of the sleeve that extends radially outboard from the first portion, and a second portion that extends from the connecting portion axially away from the first portion to a second end of the sleeve, wherein the first seal extends between the outer surface of the first portion of the sleeve and the housing, and the second seal extends between the inner surface of the second portion of the sleeve and the exterior surface of the rotor shaft.

According to a third aspect of the present disclosure, an electric drive unit includes a motor disposed within a housing and having a rotor shaft that is configured to be rotationally driven about an axis, a sleeve extending about the rotor shaft, a first seal extending between the sleeve and the housing, and a shunt fixed to the first seal and extending between the sleeve and the housing to ground the rotor shaft to the housing via the sleeve.

Embodiments of the third aspect of the disclosure can include any one or a combination of the following features:
 a second seal extending between the sleeve and the rotor shaft;

the sleeve includes an inner surface that interfaces with the rotor shaft, and an outer surface opposite the inner surface, wherein the first seal and the shunt extend between the outer surface of the sleeve and the housing, and the second seal extends between the inner surface of the sleeve and the rotor shaft;

the sleeve further includes a first portion that extends axially from a first end of the sleeve to a connecting portion of the sleeve that extends radially outboard from the first portion, and a second portion that extends from the connecting portion axially away from the first portion to a second end of the sleeve, wherein the first seal and the shunt extend between the outer surface of the first portion of the sleeve and the housing, and the second seal extends between the inner surface of the second portion of the sleeve and the rotor shaft; and the housing includes a bearing shield, wherein the first seal extends between the sleeve and a portion of the bearing shield.

These and other features, advantages, and objects of the present disclosure will be further understood and appreciated by those skilled in the art by reference to the following specification, claims, and appended drawings.

Figure 1:
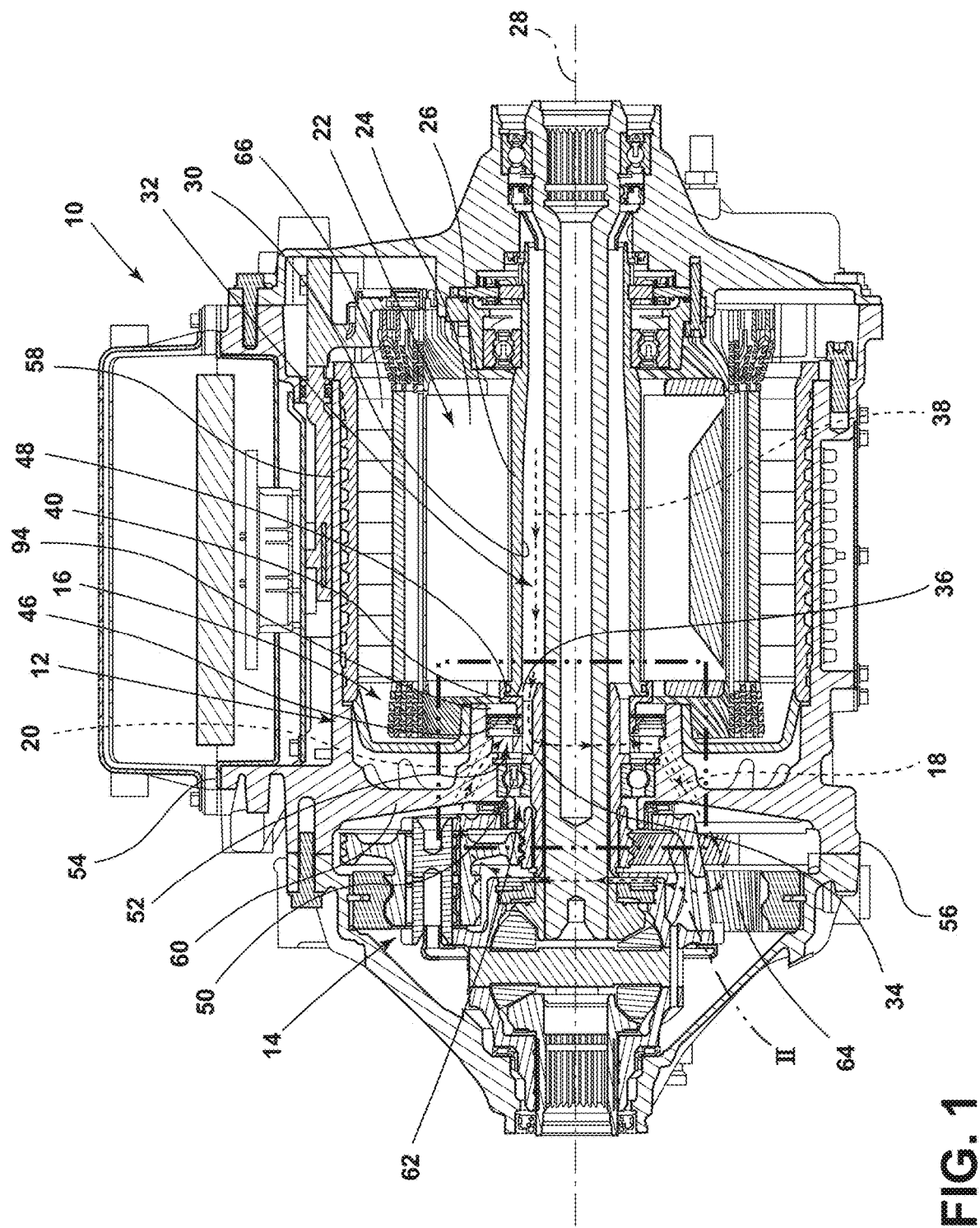
FIG. 1 is a cross-sectional view of an electric drive unit that defines a fluid flow path.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis.

Referring now to FIGS. 1-5, an electric drive unit 10 includes a housing 12. The housing 12 defines a gearbox region 14, a motor housing region 16, a first channel 18 extending between the gearbox region 14 and the motor housing region 16, and a second channel 20 extending between the gearbox region 14 and the motor housing region 16. A motor 22 is disposed within the motor housing region 16. The motor 22 includes a rotor 24 and a rotor shaft 26 that is configured to be rotationally driven about an axis 28. The rotor shaft 26 includes an interior surface 30 that defines a hollow 32, an exterior surface 34 opposite the interior surface 30, and a port 36 that extends between the interior and exterior surfaces 30, 34. The hollow 32 and the port 36 form a portion of a fluid flow path 38 of the electric drive unit 10. A sleeve 40 extends circumferentially along the exterior surface 34 of the rotor shaft 26 proximate to the port 36. The sleeve 40 includes an inner surface 42 that interfaces with the exterior surface 34 of the rotor shaft 26 and an outer surface 44 opposite the inner surface 42. A first seal 46 extends between the outer surface 44 of the sleeve 40 and the housing 12. A second seal 48 extends between the inner surface 42 of the sleeve 40 and the exterior surface 34 of the rotor shaft 26. A bearing 50 is positioned radially between the rotor shaft 26 and the housing 12 and is positioned axially between the first seal 46 and the gearbox region 14. The fluid flow path 38 is configured to sequentially convey fluid within the hollow 32, through the port 36, into a receiving area 52 of the fluid flow path 38 that is positioned axially between the first seal 46 and the bearing 50 and radially between the exterior surface 34 of the rotor shaft 26 and the housing 12, through the first channel 18, into the gearbox region 14, and through the second channel 20 back into the receiving area 52 of the fluid flow path 38.

Figure 2:
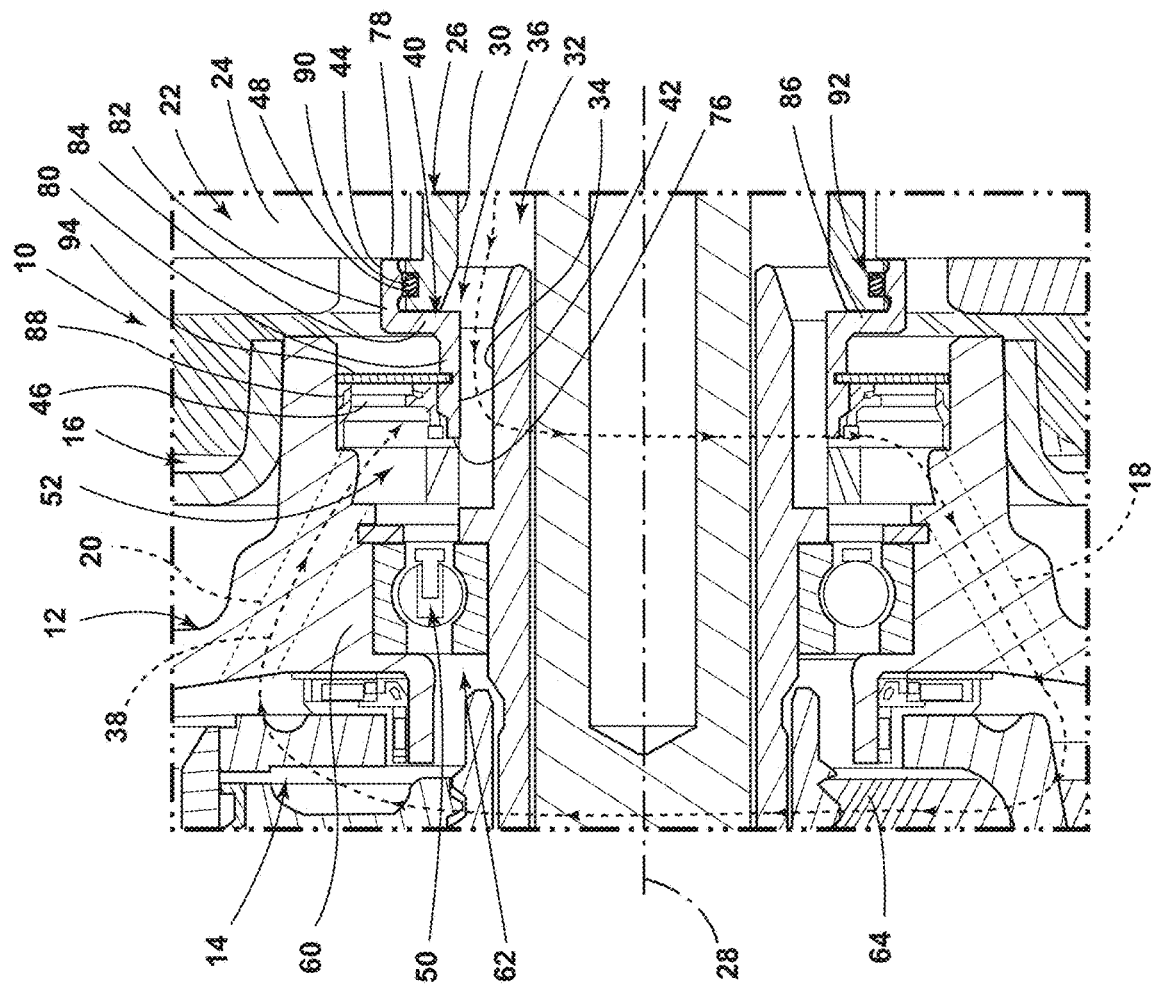
FIG. 2 is an enlarged view of area II of FIG. 1, illustrating a receiving area of the fluid flow path that is positioned axially between a first seal and a bearing of the electric drive unit and radially between a rotor shaft and a housing of the electric drive unit.

Referring now to FIGS. 1 and 2, the electric drive unit 10 includes the housing 12. The housing 12 can be an assembly of a plurality of components, in some examples. For example, in the embodiment illustrated in FIG. 1, the housing 12 is a die-cast aluminum housing 12 formed of a plurality of components. The housing 12 includes a top 54 and a bottom 56 opposite the top 54. The top 54 of the housing 12 may be the vehicle-upward-most portion of the housing 12 when the electric drive unit 10 is installed onto a vehicle (not shown). The bottom 56 of the housing 12 may be the vehicle-downward-most portion of the housing 12 when the electric drive unit 10 is installed onto the vehicle. As illustrated in FIG. 1, the housing 12 includes an outer wall 58 that extends circumferentially about the motor 22 of the electric drive unit 10. The housing 12 further includes a bearing shield 60. The bearing shield 60 extends radially inboard from the outer wall 58 and defines a central aperture 62 through which the axis 28 extends.

In various embodiments, the housing 12 defines the motor housing region 16. The motor 22 of the electric drive unit 10 is disposed within the motor housing region 16. As illustrated in FIG. 1, the motor housing region 16 can be at least partially defined by the outer wall 58 and the bearing shield 60 of the housing 12. The housing 12 can further define the gearbox region 14. The bearing shield 60 can partially define the gearbox region 14. For example, in the embodiment illustrated in FIG. 1, the bearing shield 60 extends between and partially defines the gearbox region 14 and the motor housing region 16. Components of the electric drive unit 10, such as a gearset 64 and a differential, may be disposed within the gearbox region 14 defined by the housing 12. Further, the gearbox region 14 may serve as a reservoir for fluid (e.g., oil) that is utilized in the electric drive unit 10.

In various embodiments, the housing 12 defines the first channel 18 that extends between the gearbox region 14 and the motor housing region 16 and the second channel 20 that extends between the gearbox region 14 and the motor housing region 16. In the embodiment illustrated in FIGS. 1 and 2, the bearing shield 60 defines the first and second channels 18, 20, such that the first and second channels 18, 20 extend through the bearing shield 60 from the motor housing region 16 to the gearbox region 14. In various implementations, the first channel 18 is positioned elevationally between the rotor shaft 26 and the bottom 56 of the housing 12, and the second channel 20 is positioned elevationally between the rotor shaft 26 and the top 54 of the housing 12. For example, as illustrated in FIG. 1, the first and second channels 18, 20 are positioned radially outboard of the central aperture 62 defined by the bearing shield 60, the first channel 18 being positioned elevationally between the rotor shaft 26 and the bottom 56 of the housing 12, and the second channel 20 being positioned elevationally between the rotor shaft 26 and the top 54 of the housing 12. The first and second channels 18, 20 may be portions of the fluid flow path 38 as described further herein.

Referring now to FIGS. 1-5, the electric drive unit 10 includes the motor 22. The motor 22 includes a stator 66, the rotor 24, and the rotor shaft 26. In an exemplary embodiment, operation of the motor 22 drives rotation of the rotor shaft 26 about the axis 28 to drive first and second output shafts that are operably coupled to the rotor shaft 26 via the gearset 64 and differential disposed within the gearbox region 14 defined by the housing 12. A variety of types of electric motors are contemplated for use in the electric drive unit 10, such as the induction motor illustrated in FIG. 1. The rotor shaft 26 is positioned radially inboard of the rotor 24 and stator 66 and extends axially through the rotor 24 of the motor 22.

As illustrated in FIGS. 1 and 2, the rotor shaft 26 includes the interior surface 30 and the exterior surface 34 opposite the interior surface 30. The interior surface 30 of the rotor shaft 26 defines the hollow 32. Output shafts may extend within the hollow 32 defined by the interior surface 30 of the rotor shaft 26 in various implementations. The rotor shaft 26 defines the port 36 that extends between the interior and exterior surfaces 30, 34. The hollow 32 and the port 36 can form a portion of the fluid flow path 38, as described further herein.

Figure 3:
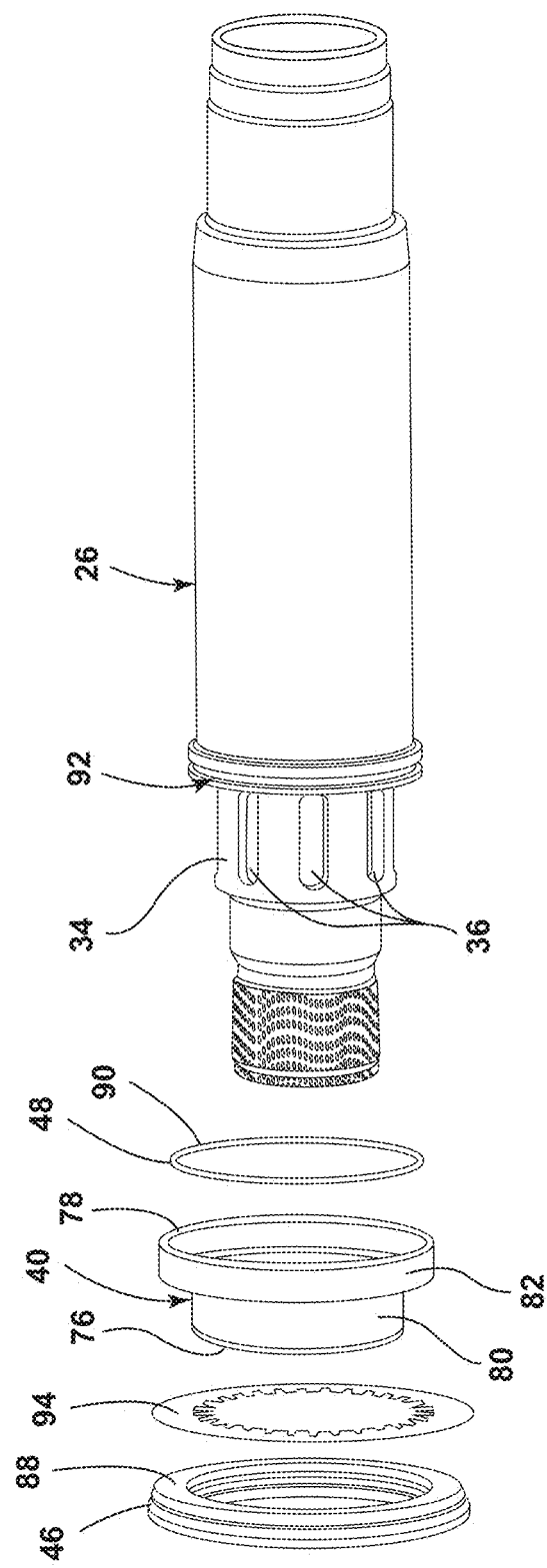
FIG. 3 is an exploded top perspective view of a portion of the electric drive unit illustrating a first seal, a shunt, a sleeve, a second seal, and a rotor shaft.
Figure 4:
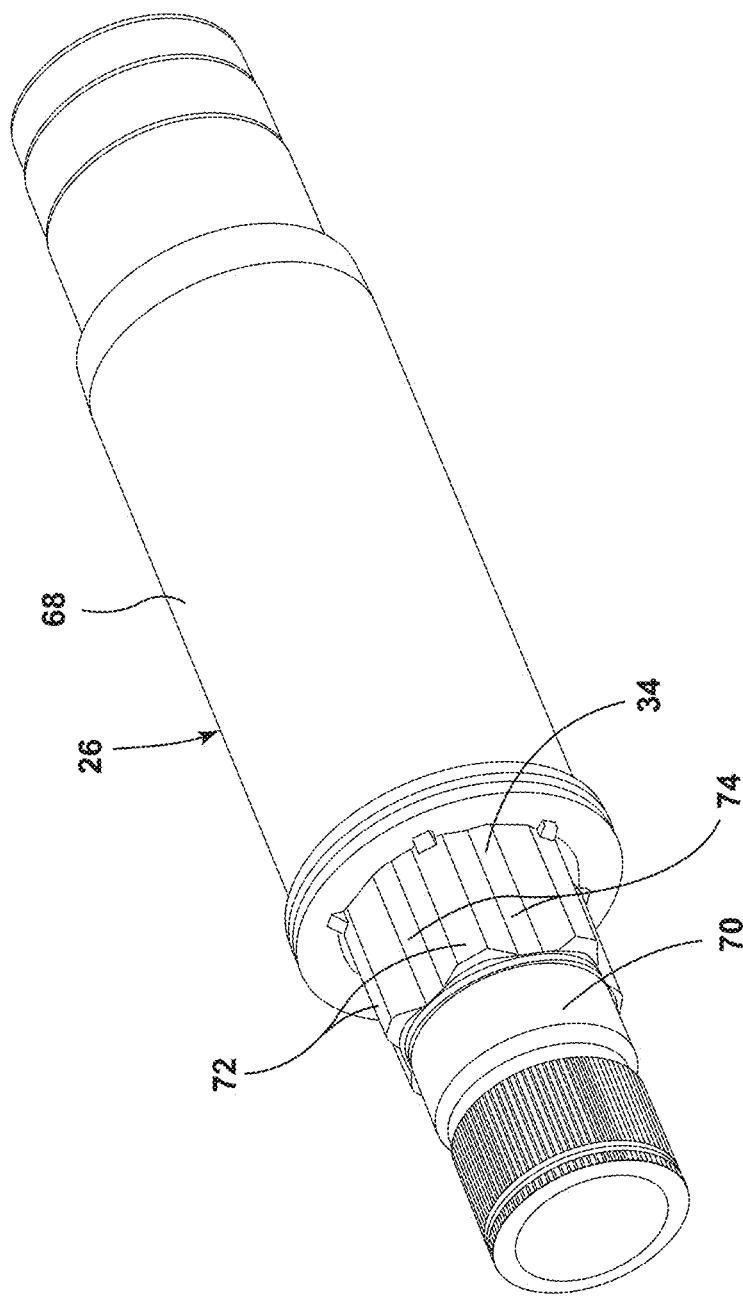
FIG. 4 is a top perspective view of a rotor shaft.
Figure 5:
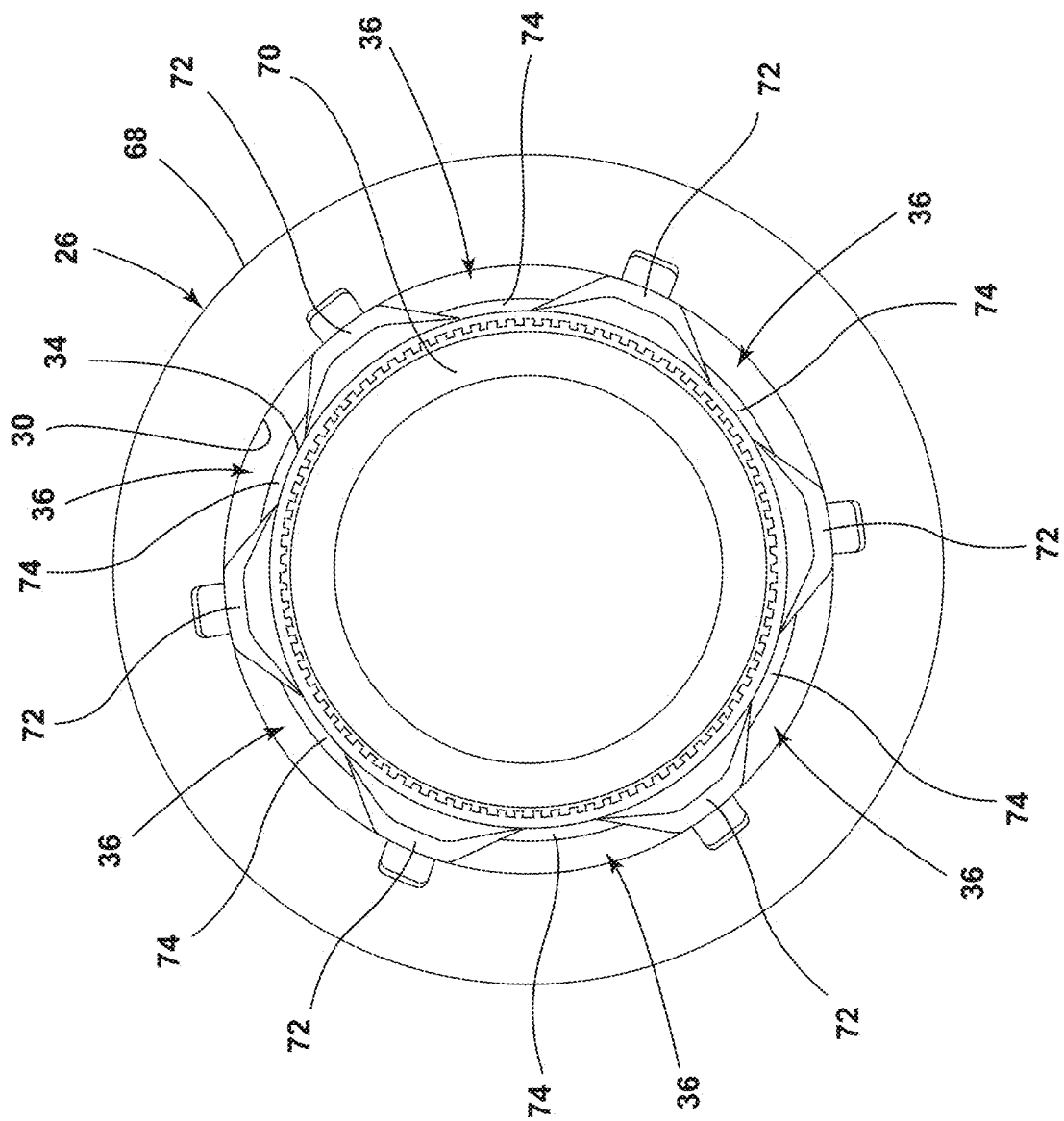
FIG. 5 is a side elevational view of a rotor shaft.

Referring now to FIGS. 3-5, in various embodiments, the rotor shaft 26 can define a plurality of ports 36 that extend between the interior surface 30 and the exterior surface 34 of the rotor shaft 26, as illustrated exemplarily in FIGS. 3-5. In the embodiment illustrated in FIG. 3, the rotor shaft 26 is an integrally formed unitary body that defines the plurality of ports 36 in the form of apertures that extend through the rotor shaft 26. In some embodiments, the rotor shaft 26 can be a plurality of components coupled together. For example, in the embodiment illustrated in FIGS. 4 and 5, the rotor shaft 26 includes a first shaft portion 68 and a second shaft portion 70 welded to the first shaft portion 68. As illustrated in FIG. 5, a portion of the exterior surface 34 of the second shaft portion 70 forms a plurality of alternating protruding ridges 72 and recessed valleys 74. The protruding ridges 72 of the second shaft portion 70 are generally aligned with the interior surface 30 of the first shaft portion 68 when the first and second shaft portions 68, 70 are aligned axially. As illustrated in FIGS. 4 and 5, the second shaft portion 70 is welded to the first shaft portion 68 proximate to the intersection of the exterior surface 34 of the protruding ridges 72 of the second shaft portion 70 and the interior surface 30 of the first shaft portion 68. The exterior surface 34 of the second shaft portion 70 in the recessed valleys 74 is disposed radially inboard of the exterior surface 34 of the second shaft portion 70 on the protruding ridges 72 and the interior surface 30 of the first shaft portion 68. As such, the rotor shaft 26 defines the plurality of ports 36 that extends from the interior surface 30 of the first shaft portion 68 of the rotor shaft 26 to the exterior surface 34 of the second shaft portion 70 of the rotor shaft 26, as illustrated in FIG. 5.

Referring now to FIGS. 1-3, the electric drive unit 10 includes the sleeve 40. The sleeve 40 extends about the rotor shaft 26. In various implementations, the sleeve 40 extends circumferentially about the exterior surface 34 of the rotor shaft 26. As illustrated in FIG. 2, the sleeve 40 is positioned proximate to the port 36 defined by the rotor shaft 26. The sleeve 40 includes the inner surface 42 and the outer surface 44 opposite the inner surface 42. The inner surface 42 interfaces with the exterior surface 34 of the rotor shaft 26, as illustrated in FIGS. 1 and 2.

As illustrated in FIGS. 1-3, the sleeve 40 includes a first end 76, a second end 78, a first portion 80, a second portion 82, and a connecting portion 84. The first end 76 of the sleeve 40 is the portion of the sleeve 40 that is nearest to the gearbox region 14 defined by the housing 12. The first portion 80 extends axially away from the gearbox region 14 from the first end 76 of the sleeve 40 to the connecting portion 84 of the sleeve 40. The connecting portion 84 of the sleeve 40 extends radially outboard from the first portion 80 to the second portion 82 of the sleeve 40. In the embodiment illustrated in FIGS. 1-3, the connecting portion 84 of the sleeve 40 extends radially outboard from the first portion 80 of the sleeve 40 in a direction that is substantially perpendicular to the axis 28, such that the connecting portion 84 forms a flange 86. It is contemplated that the connecting portion 84 can extend radially outboard from the first portion 80 at a variety of other angles, in various embodiments. The second portion 82 of the sleeve 40 extends axially away from the gearbox region 14 from the connecting portion 84 to the second end 78 of the sleeve 40. As illustrated in FIGS. 1 and 2, the second end 78 of the sleeve 40 is the portion of the sleeve 40 that is furthest from the gearbox region 14 defined by the housing 12. The sleeve 40 may be formed of and/or coated with a conductive material, such as silver, to allow the sleeve 40 to effectively ground the rotor shaft 26 to the housing 12, as described further herein.

Referring still to FIGS. 1-3, the first seal 46 extends between the sleeve 40 and the housing 12. In various embodiments, the first seal 46 extends between the outer surface 44 of the sleeve 40 and the housing 12. For example, the first seal 46 can extend between the outer surface 44 of the sleeve 40 and the bearing shield 60 of the housing 12. In the embodiment illustrated in FIGS. 1-3, the first seal 46 is a lip seal 88. It is contemplated that the first seal 46 may be one or more of a variety of types of seals, in various embodiments.

The second seal 48 can extend between the sleeve 40 and the rotor shaft 26. In various embodiments, the second seal 48 extends between the inner surface 42 of the sleeve 40 and the rotor shaft 26. For example, the second seal 48 can extend between the inner surface 42 of the sleeve 40 and the exterior surface 34 of the rotor shaft 26. As illustrated in FIGS. 1-3, the second seal 48 is an o-ring 90. It is contemplated that the second seal 48 may be one or more of a variety of types of seals, in various embodiments.

In the exemplary embodiment illustrated in FIGS. 1 and 2, wherein the sleeve 40 of the electric drive unit 10 includes the first portion 80, the second portion 82, and the connecting portion 84, the first seal 46 extends between the outer surface 44 of the first portion 80 of the sleeve 40 and the bearing shield 60 of the housing 12, and the second seal 48 extends between the inner surface 42 of the second portion 82 of the sleeve 40 and the exterior surface 34 of the rotor shaft 26. In the illustrated embodiment, the exterior surface 34 of the rotor shaft 26 defines an annular recess 92, and the second seal 48 is the o-ring 90 received within the annular recess 92. In various embodiments, the first and second seals 46, 48 are configured to prevent fluid from deviating from the fluid flow path 38 and flowing to the rotor 24 of the electric drive unit 10. In some embodiments, the sleeve 40 and the first seal 46 may prevent fluid from deviating from the fluid flow path 38 and flowing to the rotor 24 without employing use of the second seal 48. For example, the sleeve 40 may be welded to the rotor shaft 26, such that fluid is prevented from passing between the sleeve 40 and the rotor shaft 26 to the rotor 24. In this example, the second seal 48 can be omitted.

Referring still to FIGS. 1-3, the electric drive unit 10 includes a shunt 94. The shunt 94 is fixed to the first seal 46 and is configured to extend between the sleeve 40 and the housing 12 to ground the rotor shaft 26 to the housing 12 via the sleeve 40. In the embodiment illustrated in FIGS. 1 and 2, the first seal 46 and the shunt 94 extend between the outer surface 44 of the first portion 80 of the sleeve 40 and the bearing shield 60 of the housing 12. The shunt 94 can be fixed to the first seal 46 in a variety of manners (e.g., press fit, overmolded, adhesives, etc.). The shunt 94 and the first seal 46 can be formed of different materials, the shunt 94 being formed of a material of lower resistivity than the first seal 46.

Referring now to FIGS. 1 and 2, the electric drive unit 10 includes the bearing 50. The bearing 50 may be configured to support the rotor shaft 26 and facilitate rotation of the rotor shaft 26 about the axis 28. In various implementations, the bearing 50 is positioned radially between the rotor shaft 26 and the housing 12, and axially between the first seal 46 and the gearbox region 14 defined by the housing 12. As illustrated in FIGS. 1 and 2, the bearing 50 is positioned radially between the bearing shield 60 and the exterior surface 34 of the rotor shaft 26 and extends therebetween. In various embodiments, the first and second channels 18, 20 extend through the bearing shield 60 radially outboard of the bearing 50.

Referring now to FIG. 1, the electric drive unit 10 defines the fluid flow path 38 that fluid flows within. In an exemplary embodiment, the fluid that flows within the fluid flow path 38 is oil; however, other fluids may be utilized, in some embodiments. The fluid flow path 38 may include, but is not limited to, the hollow 32 defined by the interior surface 30 of the rotor shaft 26, the port 36 that extends through the rotor shaft 26, the first channel 18 defined by the housing 12, the gearbox region 14 defined by the housing 12, the second channel 20 defined by the housing 12, and the receiving area 52. In various embodiments, the receiving area 52 of the fluid flow path 38 is positioned axially between the first seal 46 and the bearing 50 and radially between the exterior surface 34 of the rotor shaft 26 and the housing 12. As illustrated in FIG. 2, the receiving area 52 of the fluid flow path 38 is positioned radially between the exterior surface 34 of the rotor shaft 26 and a portion of the bearing shield 60. Further, the first and second channels 18, 20 extend through the bearing shield 60 from the gearbox region 14 to the receiving area 52 of the fluid flow path 38.

In operation of the electric drive unit 10, the fluid flow path 38 is configured to convey fluid along a portion of a fluid circuit. As illustrated in FIG. 1, the fluid flow path 38 can be configured to convey fluid along a portion of the fluid circuit by conveying the fluid sequentially (1) within the hollow 32 defined by the interior surface 30 of the rotor shaft 26, (2) through the port 36 extending from the interior surface 30 of the rotor shaft 26 to the exterior surface 34 of the rotor shaft 26, (3) into the receiving area 52 of the fluid flow path 38, (4) through the first channel 18 defined by the housing 12, (5) into the gearbox region 14 defined by the housing 12, and (6) through the second channel 20 defined by the housing 12 back into the receiving area 52 of the fluid flow path 38.

In some embodiments, wherein the first channel 18 is elevationally downward of the rotor shaft 26, and the second channel 20 is elevationally upward of the rotor shaft 26, gravity may cause the fluid to drain from the receiving area 52 of the fluid flow path 38 through the first channel 18 into the gearbox region 14 defined by the housing 12. Subsequently, the gearset 64 within the gearbox region 14 may splash the fluid upward, such that the fluid is conveyed into the second channel 20 and flows back into the receiving area 52. As illustrated in FIGS. 1 and 2, the first channel 18 angles downward from the motor housing region 16 to the gearbox region 14, and the second channel 20 angles downward from the gearbox region 14 to the motor housing region 16. Thus, gravity may aid the flow of the fluid through the first channel 18 from the motor housing region 16 to the gearbox region 14 and through the second channel 20 from the gearbox region 14 to the motor housing region 16.

The electric drive unit 10 of the present disclosure may provide a variety of advantages. First, the shunt 94 grounding the rotor shaft 26 to the housing 12 may prevent pitting from occurring in the bearing 50. Second, the sleeve 40 being coated with conductive material, such as silver, may desirably lower impedance. Third, the housing 12 defining the first and second channels 18, 20 may allow oil to both drain from the receiving area 52 of the fluid flow path 38 that is in the motor housing region 16 into the gearbox region 14 and reenter the receiving area 52 of the fluid flow path 38 from the gearbox region 14. Accordingly, during operation of the electric drive unit 10, the first and second channels 18, 20 allow the bearing 50 to be cooled and lubricated and prevent the gearbox region 14 from running dry. Fourth, the sleeve 40, the first and second seals 46, 48, the shunt 94, and the first and second channels 18, 20 being arranged in the radially-compact orientation illustrated in FIGS. 1 and 2 may save space within the electric drive unit 10.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 electric drive unit
12 housing
14 gearbox region
16 motor housing region
18 first channel
20 second channel
22 motor
24 rotor
26 rotor shaft
28 axis
30 interior surface
32 hollow
34 exterior surface
36 port
38 fluid flow path
40 sleeve
42 inner surface
44 outer surface
46 first seal
48 second seal
50 bearing
52 receiving area
54 top
56 bottom
58 outer wall
60 bearing shield
62 central aperture
64 gearset
66 stator
68 first shaft portion
70 second shaft portion
72 protruding ridges
74 recessed valleys
76 first end
78 second end
80 first portion
82 second portion
84 connecting portion
86 flange
88 lip seal
90 o-ring
92 annular recess
94 shunt

What is claimed is:

1. An electric drive unit, comprising:
a housing that defines a gearbox region, a motor housing region, a first channel extending between the gearbox region and the motor housing region, and a second channel extending between the gearbox region and the motor housing region;
a motor disposed within the motor housing region and having a rotor and a rotor shaft that is configured to be rotationally driven about an axis, the rotor shaft having an interior surface that defines a hollow, an exterior surface opposite the interior surface, and a port that extends between the interior and exterior surfaces, wherein the hollow and the port form a portion of a fluid flow path;
a sleeve extending circumferentially along the exterior surface of the rotor shaft proximate to the port and having an inner surface that interfaces with the exterior surface and an outer surface opposite the inner surface;
a first seal extending between the outer surface of the sleeve and the housing;
a second seal extending between the inner surface of the sleeve and the exterior surface of the rotor shaft; and
a bearing positioned radially between the rotor shaft and the housing and axially between the first seal and the gearbox region, wherein the fluid flow path is configured to sequentially convey fluid within the hollow, through the port, into a receiving area of the fluid flow path that is positioned axially between the first seal and the bearing and radially between the exterior surface of the rotor shaft and the housing, through the first channel, into the gearbox region, and through the second channel back into the receiving area of the fluid flow path.

2. The electric drive unit of claim 1, further comprising:
a shunt fixed to the first seal and extending between the sleeve and the housing to ground the rotor shaft to the housing via the sleeve.

3. The electric drive unit of claim 1, wherein the first and second seals are configured to prevent the fluid from flowing to the rotor.

4. The electric drive unit of claim 1, wherein the sleeve comprises:
a first portion that extends axially away from the gearbox region from a first end of the sleeve to a connecting portion that extends radially outboard from the first portion; and
a second portion that extends axially away from the gearbox region from the connecting portion to a second end of the sleeve, wherein the first seal extends between the outer surface of the first portion of the sleeve and the housing, and the second seal extends between the inner surface of the second portion of the sleeve and the exterior surface of the rotor shaft.

5. The electric drive unit of claim 4, wherein the exterior surface of the rotor shaft defines an annular recess, and the second seal comprises an o-ring received within the annular recess.

6. The electric drive unit of claim 5, wherein the housing comprises:
an outer wall that extends circumferentially about the motor; and
a bearing shield that extends radially inboard from the outer wall, wherein the bearing is positioned radially between the bearing shield and the rotor shaft.

7. The electric drive unit of claim 6, wherein the first seal extends between the outer surface of the sleeve and a portion of the bearing shield.

8. The electric drive unit of claim 7, wherein the bearing shield extends between and partially defines the gearbox region and the motor housing region, the first channel defined by the housing extends through the bearing shield from the receiving area to the gearbox region, and the second channel defined by the housing extends through the bearing shield from the receiving area to the gearbox region.

9. The electric drive unit of claim 8, wherein the first and second channels extend through the bearing shield radially outboard of the bearing.

10. The electric drive unit of claim 8, wherein the housing further comprises:
a top; and
a bottom opposite the top, wherein the first channel is positioned elevationally between the rotor shaft and the bottom, and the second channel is positioned elevationally between the rotor shaft and the top.

11. An electric drive unit, comprising:
a housing;
a motor disposed within the housing and having a rotor and a rotor shaft that is configured to be rotationally driven about an axis, the rotor shaft having an interior surface that defines a hollow, an exterior surface opposite the interior surface, and a port that extends between the interior and exterior surfaces;
a sleeve extending circumferentially along the exterior surface of the rotor shaft proximate to the port and having an inner surface that interfaces with the exterior surface and an outer surface opposite the inner surface; and
a first seal extending between the outer surface of the sleeve and the housing; and
a second seal extending between the inner surface of the sleeve and the exterior surface of the rotor shaft, wherein the sleeve comprises:
a first portion that extends axially from a first end of the sleeve to a connecting portion of the sleeve that extends radially outboard from the first portion; and
a second portion that extends from the connecting portion axially away from the first portion to a second end of the sleeve, wherein the first seal extends between the outer surface of the first portion of the sleeve and the housing, and the second seal extends between the inner surface of the second portion of the sleeve and the exterior surface of the rotor shaft.

12. The electric drive unit of claim 11, wherein the first seal is a lip seal and the second seal is an o-ring.

13. The electric drive unit of claim 11, further comprising:
a shunt fixed to the first seal and extending between the sleeve and the housing to ground the rotor shaft to the housing via the sleeve.

14. An electric drive unit, comprising:
a motor disposed within a housing and having a rotor shaft that is configured to be rotationally driven about an axis;
a sleeve extending about the rotor shaft;
a first seal extending between the sleeve and the housing; and
a shunt fixed to the first seal and extending between the sleeve and the housing to ground the rotor shaft to the housing via the sleeve;
further comprising:
a second seal extending between the sleeve and the rotor shaft;
wherein the sleeve comprises:
an inner surface that interfaces with the rotor shaft; and
an outer surface opposite the inner surface, wherein the first seal and the shunt extend between the outer surface of the sleeve and the housing, and the second seal extends between the inner surface of the sleeve and the rotor shaft; and
wherein the sleeve further comprises:
a first portion that extends axially from a first end of the sleeve to a connecting portion of the sleeve that extends radially outboard from the first portion; and
a second portion that extends from the connecting portion axially away from the first portion to a second end of the sleeve, wherein the first seal and the shunt extend between the outer surface of the first portion of the sleeve and the housing, and the second seal extends between the inner surface of the second portion of the sleeve and the rotor shaft.

15. The electric drive unit of claim 14, wherein the housing comprises:
a bearing shield, wherein the first seal extends between the sleeve and a portion of the bearing shield.

* * * * *